UNITED STATES PATENT OFFICE.

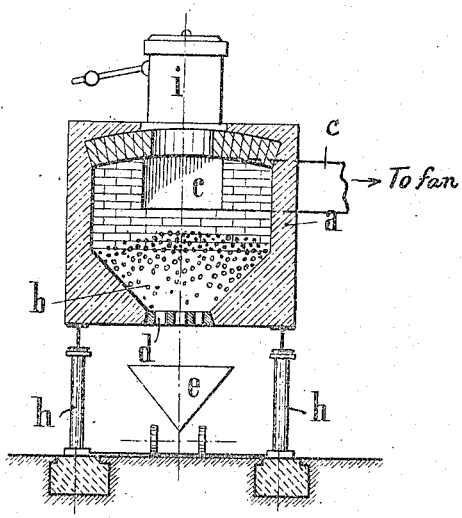
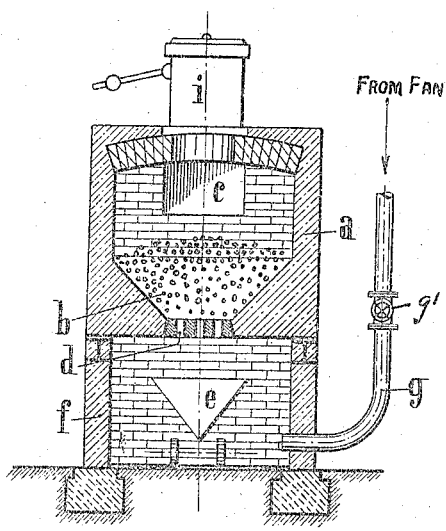

HERMANN PAPE, OF OKER-IN-THE-HARZ, GERMANY.

FURNACE FOR WORKING UP ORES.

1,144,053.

Specification of Letters Patent.   Patented June 22, 1915.

Application filed October 15, 1912.   Serial No. 725,893.

*To all whom it may concern:*

Be it known that I, HERMANN PAPE, a citizen of the German Empire, and residing at Oker-in-the-Harz, Germany, have invented certain new and useful Improvements in Furnaces for Working Up Ores, of which the following is a specification.

My invention relates to furnaces for working up a mixture of reducing agents with materials containing reducible compounds of volatile metals, as for instance iron, zinc or the like, a current of air passing from below upward through the charge being employed in a continuous process.

It is well known that materials containing volatile metals can be worked up by mixing the said materials with carbon or other reducing agents and then passing a current of air through the mixture, whereby the mixture is raised to such a high temperature that the volatile metals are reduced and immediately afterward burn to form metallic fumes, which fumes together with the furnace gases flow away and can be recovered in filtering devices after these gases have been cooled. Further, it is well known that this process may be made continuous when fans are used and the air required for the operation is sucked down into the mixture to be treated, and the products of combustion, through which the metallic fumes pass, are sucked away from the surface of the mixture, new mixture being thrown onto this surface maintained at a high temperature, while the residues containing little or no volatile metal flow out in a molten condition from the lower part of the furnace. Lastly, it is well known that the air requisite for the process is introduced in the form of compressed air into the mixture to be worked up, and that the suction action of the fan requisite for forcing the furnace gases into the filtering device is used only in order to suck away from the surface of the mixture the products of combustion traversed by metallic fumes, while the air is forced through the mixture by means of the pressure possessed by the compressed air entering into the mixture.

The success of the above-described process primarily depends on the mixture to be worked up being quite uniformly traversed by the air entering into it. In this respect experience has shown that when suction air is employed, the air is not quite correctly conducted through the mixture and that irregularities always occur which impair the performance of the furnace both as regards the mixture of ore through which the air passes and also as regards the removal of volatile constituents. As regards the employment of compressed air, the well-known method of introducing it is based on using nozzles arranged laterally at the lower part of the furnace. It is found that the air entering at a relatively very high velocity into the furnace chamber from the outlets of the nozzles produces in immediate proximity to the said outlets a very high temperature, and that the intensity of the current of air at this place is by far the greatest. If smelting furnaces of great height are being used, in which the area of the section of the furnace is small relatively to the cubic contents of the same, and in which the height of the furnace is materially greater than the diameter of the section, the defects just mentioned above scarcely occur, because the furnace gases are fairly uniformly distributed in the middle portion of the furnace, and the distribution of heat becomes equalized at this part. It is quite otherwise, however, in furnaces in which metals are volatilized. In such a furnace the charge must be of the least possible height. Therefore, when nozzles are employed in such a furnace the distribution of the compressed air in the charge is very uneven, and also the distribution of heat is by no means uniform. Experience has shown that hollow spaces are consequently formed in the furnace, arches of hardened charge being formed above the nozzles; these arches retard the working of the furnace and can be removed only by blows from above which, of course, quite prevents continuous working of the furnace. Further, the defect is met with that the outlet of the molten waste is at once stopped up owing to the molten waste congealing when the least irregularity occurs and can then be reopened only with difficulty. When the charge contains iron, stoppages composed of iron blocks are formed in addition which completely stop up the furnace and cause serious stoppages in working.

All the defects enumerated above in connection with the described employment of suction air and compressed air can be completely obviated when compressed air is employed, the compressed air not being introduced through nozzles into the charge, however, but being supplied into a closed chamber under the furnace. In this case the air passes through one or more apertures, e. g. slots, into the charge, these apertures being preferably arranged in such manner that they simultaneously serve as outlets for the molten waste of the furnace. When compressed air enters through such slots into the charge, it divides quite uniformly, penetrates the charge and causes the maximum temperature to occur in the charge directly over the apertures, so that stoppage of the outlets due to coagulation cannot take place. Preferably, the width of the inlets for the compressed air is of such a size that they just suffice for admitting the requisite amount of air for the quiet working of the furnace. In this event the molten waste flows continuously out of the furnace, the outlets are prevented from being stopped up owing to coagulation of the molten material and the air is consequently able to enter unimpededly.

One illustrative embodiment of my invention is represented by way of example in the accompanying drawing, wherein:—

Figure 1 is a vertical section through a furnace. Fig. 2 is a similar section through a modified form of furnace.

Referring first to Fig. 1, this furnace is operated with suction air and comprises the masonry body $a$ into which the charge $b$ is charged in through the charging hopper $i$. The body of the furnace rests on iron T-girders whose ends are carried by columns $h$. The bottom of the body of the furnace, which is made in such manner that it cannot be melted by the charge, is provided with slot-like apertures $d$, and a fan connected to the flue $c$ sucks air through the openings $d$ into the charge and draws away the furnace gases and the metallic smoke contained therein from the throat. The non-volatile parts of the charge $h$ which issue in a molten condition from the furnace drop through the openings $d$ into a collecting device $e$ and are removed through the latter from time to time.

Fig. 2 shows a furnace which differs from that just described only in that a completely closed chamber $f$, having at its front side a well fitting door, not shown, is located under the reduction chamber in the body $a$. The air pipe $g$, which opens into the chamber $f$, is provided with a valve $g'$ for shutting off the air when the slag wagon $e$ is filled and the door has to be opened to remove the wagon from the chamber to empty it. The working of the furnace suffers no interruption because an empty wagon is at once pushed into the chamber $f$ under the body of the furnace, whereupon the chamber is at once closed again and the air turned on, when the air entering through the pipe $g$ is distributed quite uniformly over the apertures $d$ and passes uniformly through the charge $b$.

Comparative tests of the furnace according to Fig. 1 and that according to Fig. 2 have shown that when the furnaces have exactly equal dimensions a working charge of 10 tons of ore containing zinc is worked up in 24 hours in the furnace according to Fig. 2, while the furnace according to Fig. 1 is able to work up only 4.5 tons of the same ore in the same time. Apart from the very greatly increased performance it has been found that the zinc is more completely removed in the furnace working with compressed air, the output rising, on an average, a full unit, i. e. being increased 10 kg. zinc for each 1000 kg. ore. These facts clearly show the improved operation of my new furnace.

Lastly, my improved furnace can be worked by employing cold or hot air as desired.

I claim:—

A continuously working furnace comprising a reduction chamber having a bottom part provided with perforations for the continuous removal of the molten non-volatile portions of the charge and for the introduction of compressed air into the furnace charge, means whereby the charge is fed into the reduction chamber, a tightly closed chamber below said reduction chamber for the supply of compressed air and the periodical removal of the residues resulting from combustion, and a conduit for supplying compressed air to said chamber.

In testimony whereof, I affix my signature in the presence of two witnesses.

HERMANN PAPE.

Witnesses:
 ERNEST H. L. MUMMENHOFF,
 IDA CHRIST. HAFERMANN.